(12) United States Patent
Koketsu

(10) Patent No.: US 8,713,763 B2
(45) Date of Patent: May 6, 2014

(54) HOSE CLAMP

(75) Inventor: Atsumi Koketsu, Konan (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 80 days.

(21) Appl. No.: 13/363,494

(22) Filed: Feb. 1, 2012

(65) Prior Publication Data

US 2013/0192030 A1     Aug. 1, 2013

(51) Int. Cl.
*F16L 33/02*     (2006.01)
*F16L 33/12*     (2006.01)

(52) U.S. Cl.
USPC ............................. 24/273; 24/16 PB; 24/17 B

(58) Field of Classification Search
USPC ............... 24/16 PB, 17 AP, 17 B, 270, 273
See application file for complete search history.

(56) References Cited

U.S. PATENT DOCUMENTS

| | | | | |
|---|---|---|---|---|
| 3,429,985 A | * | 2/1969 | Czigler | 174/164 |
| 3,516,631 A | * | 6/1970 | Santucci | 248/71 |
| 3,670,369 A | * | 6/1972 | McIlroy, II | 24/16 PB |
| 3,875,619 A | * | 4/1975 | Fortsch | 24/16 PB |
| 3,913,187 A | * | 10/1975 | Okuda | 24/484 |
| 4,214,351 A | * | 7/1980 | Wenk | 24/16 PB |
| 4,371,137 A | * | 2/1983 | Anscher | 248/73 |
| 4,511,164 A | | 4/1985 | Orchard | |
| 4,609,171 A | * | 9/1986 | Matsui | 248/74.3 |
| 4,669,688 A | * | 6/1987 | Itoh et al. | 248/74.2 |
| 4,958,791 A | * | 9/1990 | Nakamura | 248/74.1 |
| 5,906,342 A | * | 5/1999 | Kraus | 248/74.1 |
| 5,920,968 A | * | 7/1999 | Anscher | 24/598.2 |
| 5,937,488 A | * | 8/1999 | Geiger | 24/339 |

FOREIGN PATENT DOCUMENTS

JP     48-050158 A1     7/1973
JP     55-158308 U      11/1980

OTHER PUBLICATIONS

Japanese Office Action, Japanese Patent Application No. 2010-221274 dated Aug. 6, 2013 (2 pages).

* cited by examiner

*Primary Examiner* — Robert J Sandy
*Assistant Examiner* — Louis Mercado
(74) *Attorney, Agent, or Firm* — Burr & Brown, PLLC

(57) ABSTRACT

A hose clamp which can be produced at a low cost and quickly clamp a hose is provided. The hose clamp is made of resin and made by integrally forming a generally annular clamp body which is partially cut out and a lever continuing to an end of the cut out of the clamp body. The lever includes a first operating piece which is rotatably connected to one of the cut-out ends of the clamp body via a first hinge and has an engagement part on its tip and a second operating piece rotatably connected to the other of the cut-out ends of the clamp body via a second hinge. The tip of the second operating piece is connected to the first operating piece and an engaged part corresponding to the engagement part is formed on the outer periphery of the clamp body.

4 Claims, 6 Drawing Sheets

HOSE CLAMP

BACKGROUND OF THE INVENTION

1. Field of the Invention

The present invention relates to a hose clamp which clamps a hose connection part from the outside.

2. Description of the Related Art

Conventionally, there have been known hose clamps which clamp hose connection parts using the a leverage principle. The hose clamp disclosed in Patent Document 1 is formed into a generally annular shape by overlapping both ends of an elongated thin steel sheet and having a lever integrally fixed to the overlapped portion. By pushing down the lever toward the outer periphery of the annular clamp body, the inner diameter of the clamp body is reduced by the leverage action and the hose inserted in the hose clamp is clamped. However, there is a problem in that since this hose clamp is formed by overlapping and curving a single thin steel sheet, a heavy load must be applied to push down the lever formed on the overlapped portion, resulting in poor workability. In addition, in order to prevent the lever from rising up after being pushed down, a fixture needs to be welded separately, resulting in an increase in production cost.

In order to solve the above problems, the hose clamp according to Patent Document 2 has been proposed. Since this hose clamp is integrally formed entirely of synthetic resin, it has advantages of requiring no separate fixture and being produced at a low cost. In addition, the portion that acts as a fulcrum when the operating piece is pushed down is thin-walled, and the operating piece can be pushed down with a low load. However, there are two steps to fix the hose clamp: hooking one end of the operating piece on the fixture, and pushing down the other end of the operating piece must be taken. As a result, it takes much time to fix the hose clamp.

RELATED ART DOCUMENT

Patent Document 1: Japanese Unexamined Patent Application Publication No. 48-50158
Patent Document 2: Japanese Unexamined Utility Model Application Publication No. 55-158308

SUMMARY OF THE INVENTION

The present invention has been conceived in view of the above problem and it is an object of the invention to provide a hose clamp which can be produced at a low cost and quickly clamp a hose.

The present invention has been made to solve the above-mentioned problems. A hose clamp according the invention is made of resin and made by integrally forming a generally annular clamp body partially cut out and a lever continuing to an end of the cut out of the clamp body. The lever includes a first operating piece which is rotatably connected to one of the cut-out ends of the clamp body via a first hinge and has an engagement part on a tip thereof and a second operating piece which is rotatably connected to the other of the cut-out ends of the clamp body via a second hinge. The tip of the second operating piece is connected to a middle position of the first operating piece. An engaged part corresponding to the engagement part is formed on the outer periphery of the clamp body.

It is preferable that at least one of the clamp body and the first operating piece includes upright projections which prevent the lever in an engaged state from being laterally displaced and the other has projection receiving parts in which the projections are fitted.

Furthermore, it is preferable that displacement preventing projections which restrain a clamped hose from moving are formed on the inner periphery of the clamp body.

The hose clamp of the present invention is the same as the conventional art in that they clamp a hose by operating a lever to reduce the inner diameter of the clamp body by the action of a leverage. However, according to a first aspect of the present invention, the hose clamp can clamp a hose and fix the operating piece at the same time only by a single action of rotating the first operating piece constituting the lever so as to engage the engagement part at the end of the first operating piece with the engaged part on the outer periphery of the clamp body, which is efficient. In addition, since the entire body is integrally formed of resin, the production cost is low.

According to a second aspect of the present invention, at least one of the clamp body and the first operating piece includes the upright projections which prevent the lever in an engaged state from being laterally displaced and on the other has the projection receiving parts in which the projections are fitted. With this configuration, a lateral movement of the lever is blocked, thereby preventing the lever from being laterally displaced and the engagement from being accidentally released.

In addition, according to a third aspect of the present invention, the displacement preventing projections are formed on the inner periphery of the clamp body. With this configuration, the projections bite into the outer periphery of a hose which is in a state of being clamped, and the hose clamp can reliably prevented from coming off from the hose connection part.

DETAILED DESCRIPTION OF THE INVENTION

Figure 1:
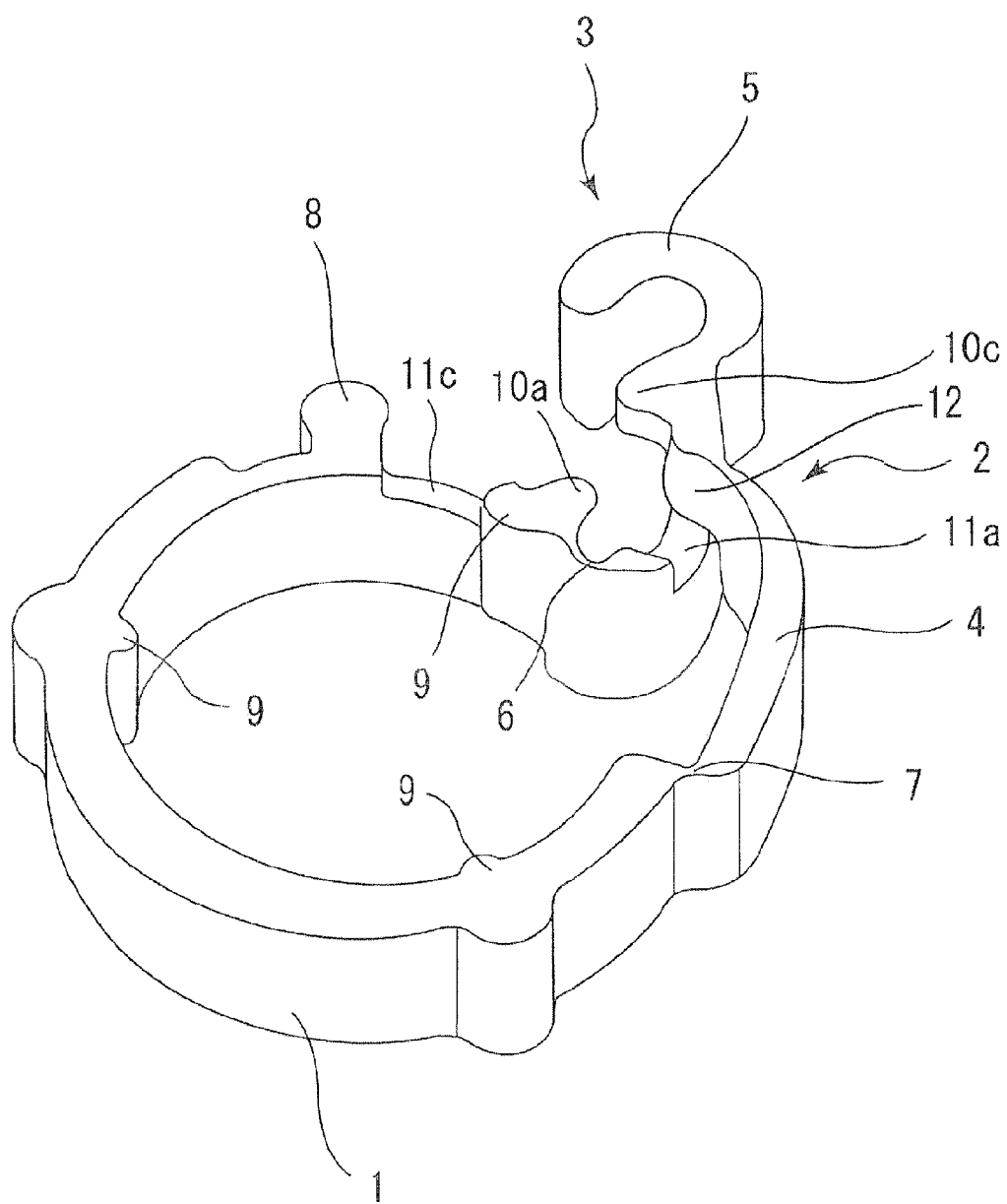
FIG. 1 is a perspective view of an embodiment according to the present invention.
Figure 2:
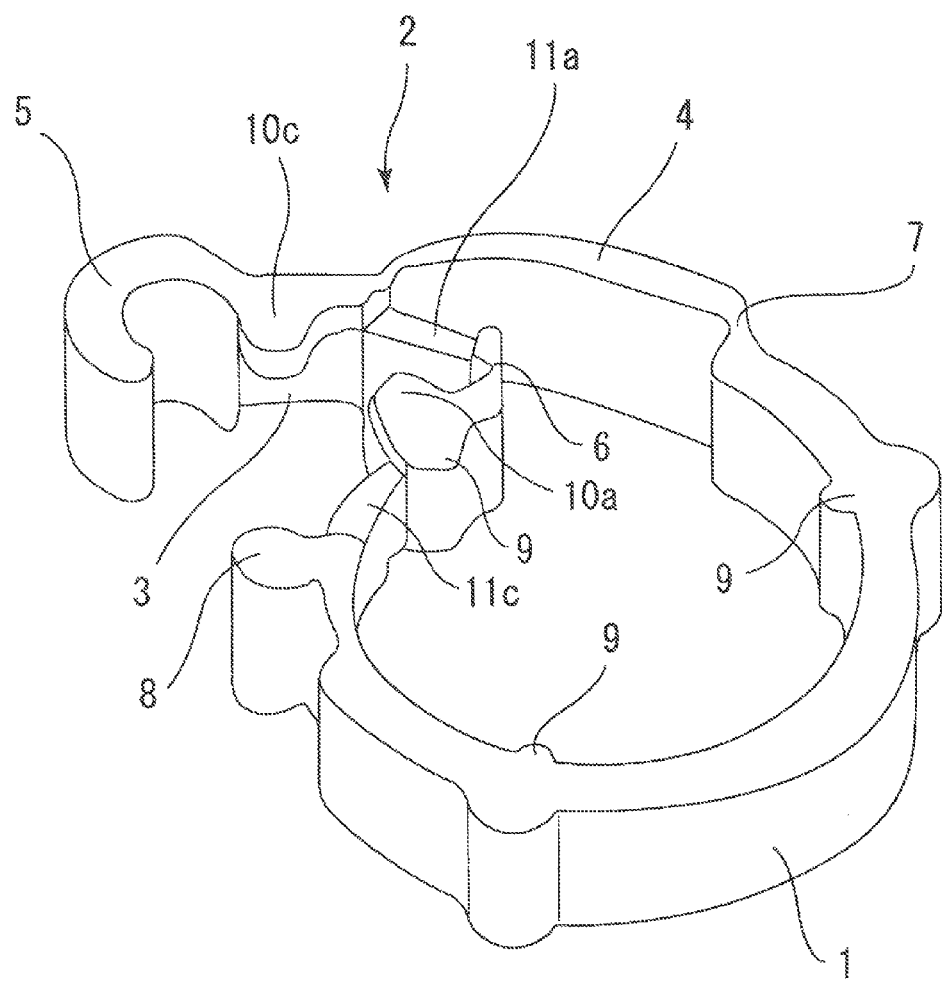
FIG. 2 is a perspective view of the hose clamp shown in FIG. 1 seen from another angle.

The preferred embodiments of the present invention will be described below. The hose clamp of the present invention is integrally formed of synthetic resin having elasticity such as polypropylene. In FIGS. 1 and 2, 1 is a generally annular clamp body which clamps a hose connection part 21, and 2 is a lever formed continuously with the clamp body 1. The clamp body 1 is shaped by cutting out a part of its annular body.

The lever 2 is constituted of a first operating piece 3 and a second operating piece 4. The first operating piece 3 has a hook-like engagement part 5 at its end, and the base of the first operating piece 3 is rotatably connected to one of the cut-out ends of the clamp body 1 via a thin-walled first hinge 6. The second operating piece 4 is shaped so as to be slightly curved outwardly. The base of the second operating piece 4 is rotatably connected to the other of the cut-out ends of the clamp body 1 via a second hinge 7, and its end is connected to the middle position 12 of the first operating piece 3. In this embodiment, it is connected to the first operating piece 3 at a position closer to the first hinge 6 slightly away from the center of the first operating piece 3. In this way, the hose clamp is continuously formed as a whole.

When the first operating piece 3 is rotated downward around the first hinge 6 as a fulcrum toward the clamp body 1, the second operating piece 4 is pulled toward the engagement part 8 side and the second hinge 7 is drawn toward the first hinge 6 side, thereby reducing the inner diameter of the clamp body 1. As a result, a hose 20 in the clamp body 1 is clamped.

Figure 3:
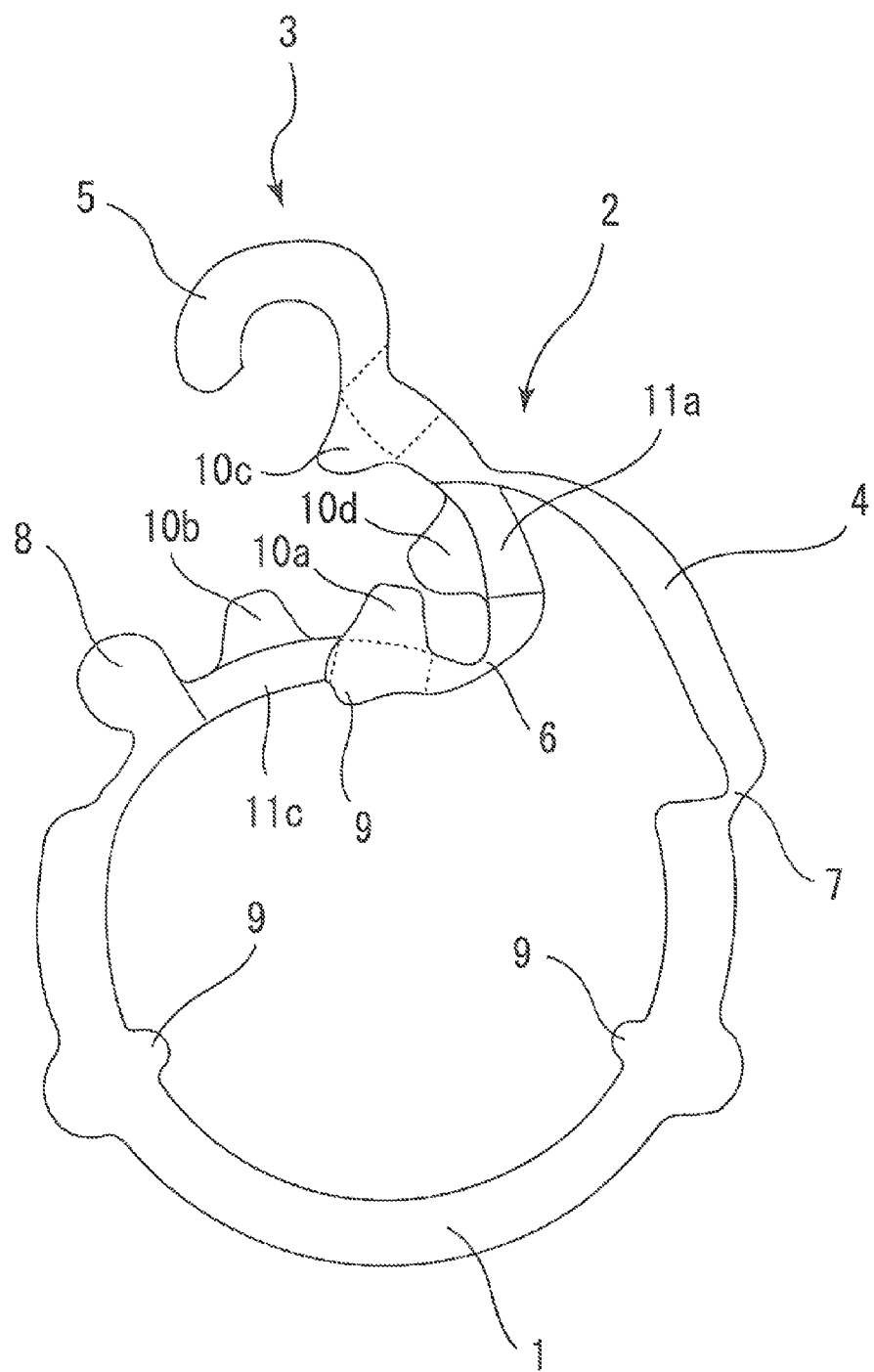
FIG. 3 is a front view of the embodiment according to the present invention.

As shown in FIG. 3, on the outer periphery of the clamp body 1, a generally circular-shaped engaged part 8 is formed at the position of intersecting with the rotation orbit of the engagement part 5. By engaging the engagement part 5 of the first operating piece 3 with the engaged part 8, the clamped state can be maintained. In this embodiment, the outside shape of the engaged part 8 is convex, which corresponds to the inside shape of the hook-like engagement part 5. However, the shape is not limited to this embodiment as long as the engaged part 8 is engaged with one-touch operation.

Figure 4:
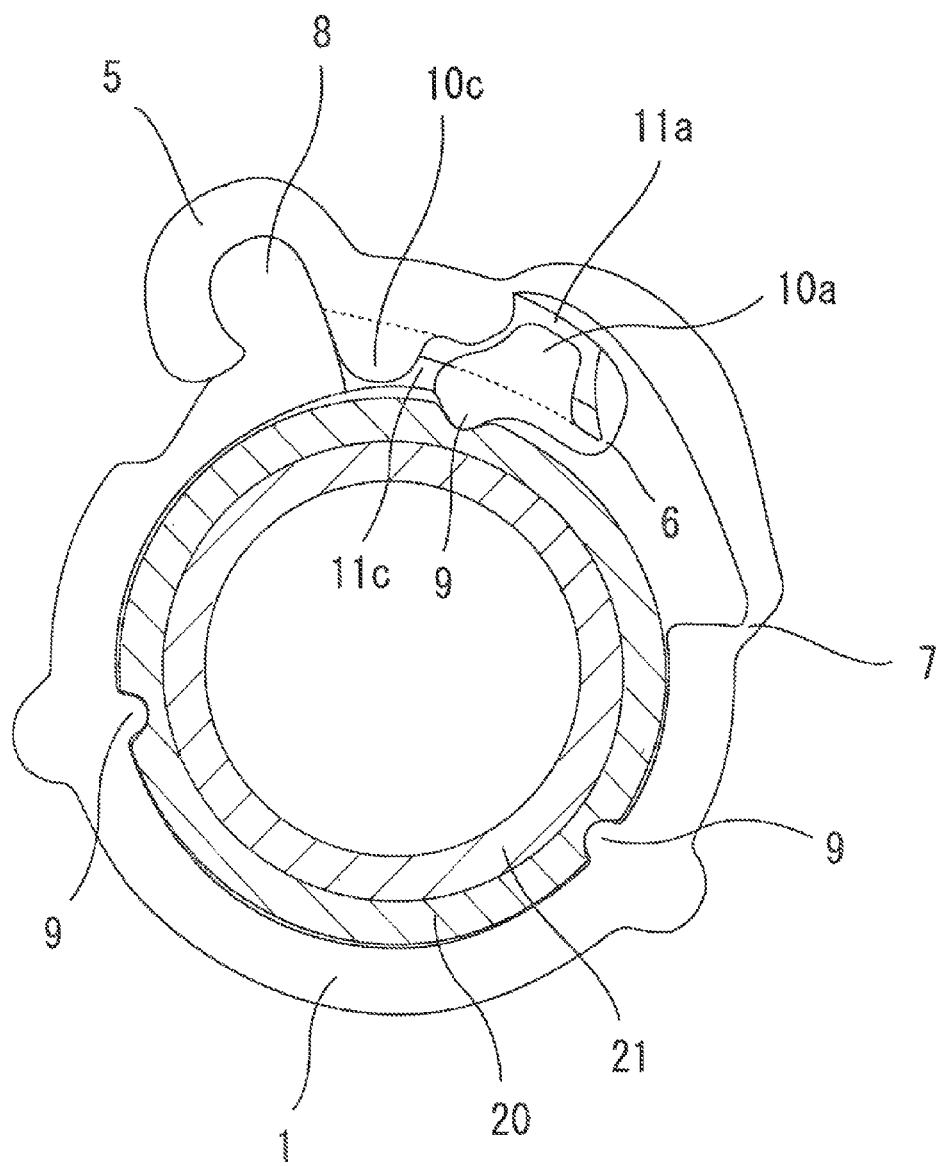
FIG. 4 is a front view showing the state in which the hose connection part is clamped.

On the other hand, on the inner periphery of the clamp body 1, generally semicircular-shaped displacement preventing projections 9 are formed at predetermined intervals. In this embodiment, three projections are formed in total, one in the vicinity of the first hinge 6 and each one at the right and left positions about 120 degrees distant therefrom. These displacement preventing projections 9 bite into the outer periphery of the hose 20 in the clamping state as shown in FIG. 4, thereby preventing the hose clamp from coming off from the hose 20.

Figure 5:
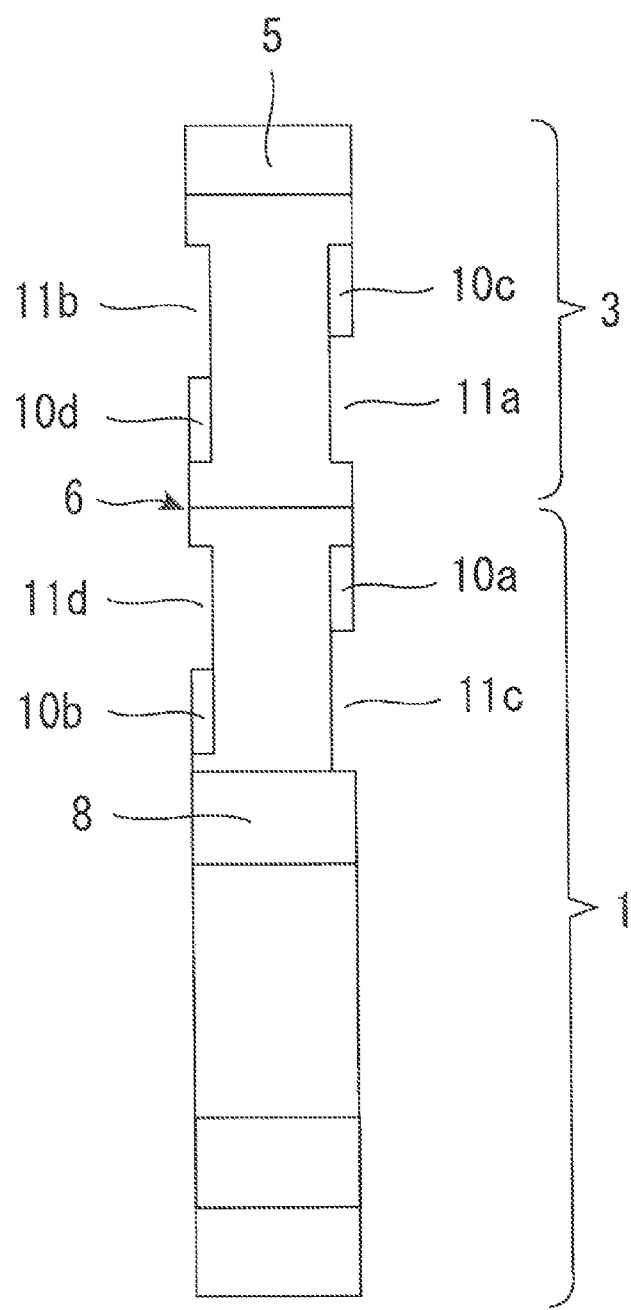
FIG. 5 is a development view showing a correspondence relation between the projections and the projection receiving parts.
Figure 6:
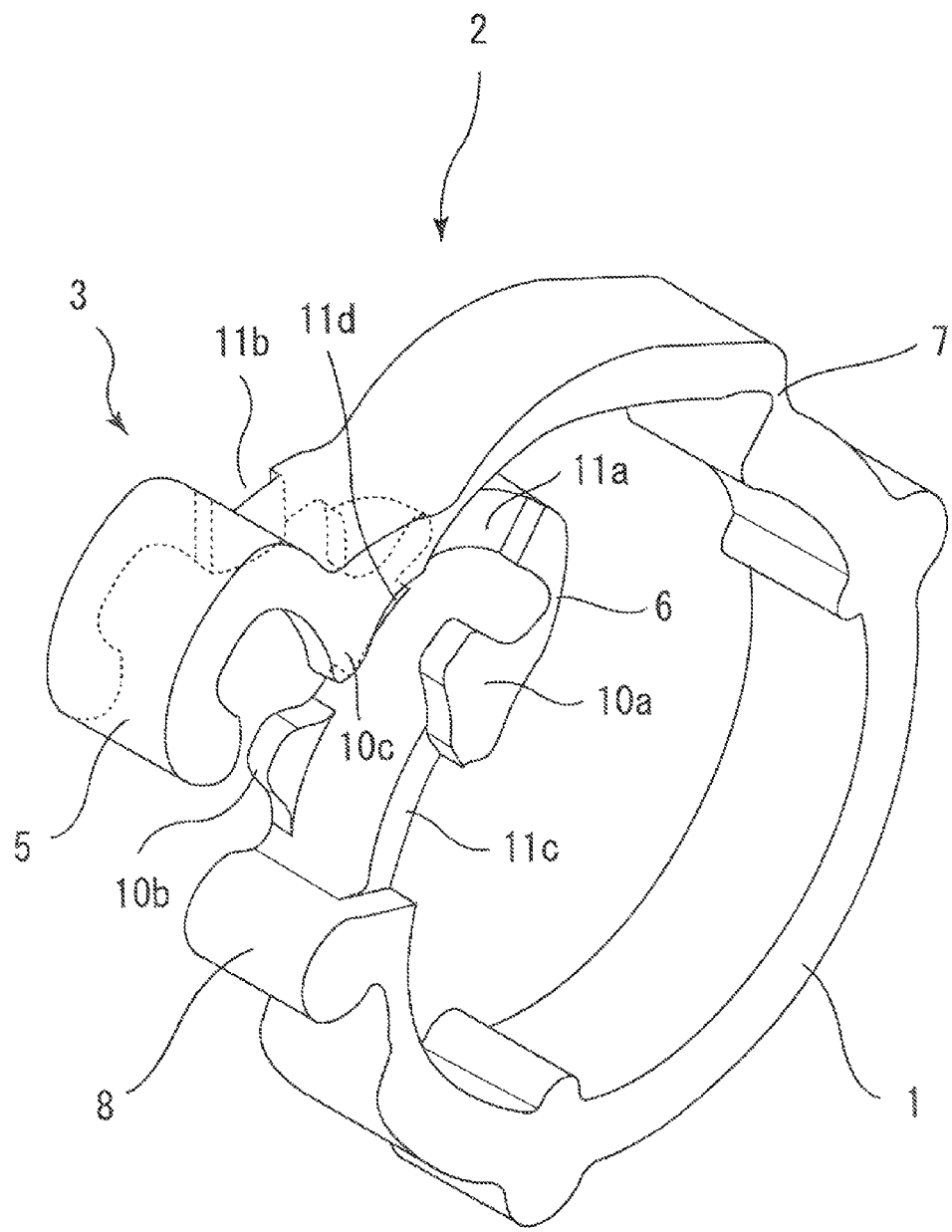
FIG. 6 is a perspective view of the hose clamp shown in FIG. 1 seen from another angle.

As shown in FIGS. 5 and 6, on the inside of the first operating piece 3 and on the outer periphery of the clamp body 1 that comes in contact with the inside of the first operating piece 3, each one pair of projections 10$a$, 10$b$ and 10$c$, 10$d$ and the projection receiving parts 11$a$, 11$b$ and 11$c$, 11$d$ in which the projections 10$a$, 10$b$ and 10$c$, 10$d$ are fitted, respectively, are formed along the rims. When the first operating piece 3 is tilted down frontward around the first hinge 6 as a fulcrum, the projections 10$a$, 10$b$ on the clamp body 1 side are fitted in the projection receiving parts 11$a$, 11$b$ on the first operating piece 3 side, while the projections 10$c$, 10$d$ on the first operating piece 3 side are fitted in the projection receiving parts 11$c$, 11$d$ on the clamp body 1 side to prevent the lever 2 from being laterally displaced. In this embodiment, the projections 10 are formed on both the first operating piece 3 side and the clamp body 1 side, and they are positioned in a staggered configuration. However, they are not limited to this configuration, and as one example, the projections 10 may be formed on either one side and the projection receiving parts 11 may be formed on the other side. Also, the number of projections 10 and the projection receiving parts 11 may be changed as appropriate.

Hereinafter, the method of clamping the hose clamp of the present invention will be described. First, the hose 20 is inserted into the clamp body 1 which is in the state of disengagement, and the hose connection part 21 is covered by the hose 20. After that, the lever 2 is pushed down toward the clamp body 1 side until the engagement part 5 is engaged with the engaged part 8. As a result, the first operating piece 3 rotates around the first hinge 6 as a fulcrum, and as it rotates, the second operating piece 4 is pulled toward the engaged part 8 side, the inner diameter of the clamp body 1 is reduced, and the hose 20 is clamped.

In the clamping state, the projections 10$a$, 10$b$ formed upright on the clamp body 1 side are fitted in the projection receiving parts 11$a$, 11$b$ on the first operating piece 3 side and the projections 10$c$, 10$d$ on the first operating piece 3 side are fitted in the projection receiving parts 11$c$, 11$d$ on the clamp body 1 side, to prevent the lever 2 from being laterally displaced. In addition, the displacement preventing projections 9 formed on the inner periphery of the clamp body 1 bite into the outer periphery of the hose 20 to prevent the hose clamp from coming off from the hose 20. The clamping state is released by lifting up the end of the engagement part 5 and releasing the engagement between part 5 and the engaged part 8.

As described above, the hose clamp according to the present invention has the engagement part 5 formed at the end of the first operating piece 3 and the engaged part 8 formed on the outer periphery of the clamp body 1. With this configuration, just by rotating the lever 2 to the clamp body 1 side, the lever 2 can be fixed to the clamp body 1 while the inner diameter of the clamp body 1 is reduced. Therefore, it does not take much time to install the hose clamp and a working efficiency is high. Also, in the state where the engagement part 5 is engaged with the engaged part 8, the projections 10$a$, 10$b$, 10$c$, 10$d$ are fitted in the projection receiving parts 11$a$, 11$b$, 11$c$, 11$d$, respectively. This prevents the lever 2 from being laterally displaced and the engagement from being accidentally released. Furthermore, the displacement preventing projections 9 formed on the inner periphery of the clamp body 1 bite into the outer periphery of the hose 20, thereby preventing the hose clamp from coming off from the hose connection part 21. Thus, this hose clamp has various advantages.

What is claimed is:

1. A hose clamp made of resin and made by integrally forming a generally annular clamp body which has a partial cut out having two cut-out ends and a lever continuing to one of the ends of the cut out of the clamp body, wherein
    the lever includes a first operating piece which is rotatably connected to one of the cut-out ends of the clamp body via a first hinge and has an engagement part on a tip thereof and a second operating piece which is rotatably connected to the other of the cut-out ends of the clamp body via a second hinge, and
    a tip of the second operating piece is connected to a middle position of the first operating piece and an engaged part corresponding to the engagement part is formed on an outer periphery of the clamp body,
    wherein the first and second hinges are arranged adjacent to opposite sides of the partial cut out.

2. The hose clamp according to claim 1, wherein at least one of the clamp body and the first operating piece includes upright projections which prevent the lever in an engaged state from being laterally displaced and the other has projection receiving parts in which the projections are fitted.

3. The hose clamp according to claim 2, wherein displacement preventing projections which restrain a hose being clamped from moving are formed on an inner periphery of the clamp body.

4. The hose clamp according to claim 1, wherein displacement preventing projections which restrain a hose being clamped from moving are formed on an inner periphery of the clamp body.

* * * * *